United States Patent
Ali et al.

(10) Patent No.: US 12,257,973 B2
(45) Date of Patent: Mar. 25, 2025

(54) HAPTIC CUES TO HELP LOCATE SEAT CONTROLS AND BELT BUCKLES

(71) Applicant: GM Global Technology Operations LLC, Detroit, MI (US)

(72) Inventors: Kamran Ali, Troy, MI (US); Donald K. Grimm, Utica, MI (US); Anna M. Lusk, Lake Orion, MI (US); Maria del Mar Davila, Clawson, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 348 days.

(21) Appl. No.: 17/822,170

(22) Filed: Aug. 25, 2022

(65) Prior Publication Data
US 2024/0067122 A1    Feb. 29, 2024

(51) Int. Cl.
*B60R 22/48* (2006.01)

(52) U.S. Cl.
CPC ...... *B60R 22/48* (2013.01); *B60R 2022/4816* (2013.01); *B60R 2022/4825* (2013.01); *B60R 2022/485* (2013.01); *B60R 2022/4858* (2013.01); *B60R 2022/4866* (2013.01)

(58) Field of Classification Search
CPC ............ B60R 22/48; B60R 2022/4816; B60R 2022/4825; B60R 2022/485; B60R 2022/4858; B60R 2022/4866
See application file for complete search history.

(56) References Cited

U.S. PATENT DOCUMENTS

| | | | | |
|---|---|---|---|---|
| 5,915,286 | A * | 6/1999 | Figi | B60R 22/48 73/865.9 |
| 6,737,862 | B1 * | 5/2004 | Godoy | B60R 22/48 324/207.21 |
| 7,265,671 | B1 * | 9/2007 | Valles | B60N 2/002 340/541 |
| 7,932,837 | B2 * | 4/2011 | Giesa | B60R 21/01546 701/45 |
| 8,289,145 | B2 * | 10/2012 | Miller | B60R 22/48 340/457 |
| 11,465,746 | B2 * | 10/2022 | Johnson | B64D 45/00 |
| 2007/0096891 | A1 * | 5/2007 | Sheriff | B60N 2/272 297/464 |
| 2007/0182535 | A1 * | 8/2007 | Seguchi | B60R 22/48 340/687 |
| 2007/0222572 | A1 * | 9/2007 | Downey | B60R 22/48 340/457 |
| 2008/0116680 | A1 * | 5/2008 | Mita | B60R 21/01538 280/801.1 |
| 2013/0214919 | A1 * | 8/2013 | Bassali | B60R 22/48 701/1 |
| 2016/0355157 | A1 * | 12/2016 | Cech | A44B 11/2561 |
| 2019/0152418 | A1 * | 5/2019 | Coughlin | B60N 2/0252 |

(Continued)

FOREIGN PATENT DOCUMENTS

| | | | | |
|---|---|---|---|---|
| DE | 112016002497 T5 | 3/2018 | | |
| JP | 2007083942 A | * | 4/2007 | |
| WO | WO-2007141614 A1 | * | 12/2007 | ............. B60K 35/00 |

*Primary Examiner* — Nay Tun
(74) *Attorney, Agent, or Firm* — Vivacqua Crane, PLLC

(57) ABSTRACT

A system to locate seat controls and belt buckles includes a vehicle having at least one seat. A seat belt system is provided with the at least one seat having a seat belt, a belt latch and a seat belt buckle. A haptic device is provided with the seat belt system, the haptic device generating a haptic signal.

18 Claims, 5 Drawing Sheets

(56) References Cited

U.S. PATENT DOCUMENTS

| | | | |
|---|---|---|---|
| 2019/0193676 A1* | 6/2019 | Thomas | B60R 22/48 |
| 2020/0331428 A1* | 10/2020 | Thomas | B60R 22/48 |
| 2021/0253255 A1* | 8/2021 | Johnson | B60R 22/48 |
| 2022/0234540 A1* | 7/2022 | Barnes | G01V 3/08 |
| 2023/0027717 A1* | 1/2023 | Méndez Arévalo | B60R 22/48 |
| 2023/0415698 A1* | 12/2023 | Jeromin | B60R 22/48 |
| 2024/0025372 A1* | 1/2024 | Balaram | A44B 11/2546 |

* cited by examiner

HAPTIC CUES TO HELP LOCATE SEAT CONTROLS AND BELT BUCKLES

INTRODUCTION

The present disclosure relates to systems and methods to assist users to locate vehicle seat components including seat belts and seat controllers.

Vehicle seats are commonly provided with seat belts and seat belt buckles, and vehicle seats commonly include controls such as buttons and slide members that assist a user to adjust a seat position comfortable to the user for driving or riding. The user after initially entering a vehicle and sitting in a desired vehicle seat, adjusts a seat position using the seat controls and then visually or by feel locates a seat belt latch attached to a seat belt. The user then must visually or by feel locate a seat belt buckle and manually move the seat belt latch to the substantially fixed position seat belt buckle to latch the seat belt latch to the seat belt buckle.

When vehicle seats such as rear vehicle seats have gone unused for a period of time, or if the user is unfamiliar with the vehicle or the vehicle components, such as a passenger entering a ride share vehicle for the first time, seat belts may go unfastened. The usage of seat belts therefore underachieves the goal of 100% seat belt usage. For example, the National Highway Traffic Safety Administration (NHTSA) reported rear seat belt use at 75% in 2017.

Thus, while current vehicle seat belt systems achieve their intended purpose, there is a need for a new and improved system and method to locate vehicle seat belts, seat belt buckles and vehicle seat control components.

SUMMARY

According to several aspects, a haptic system to locate seat components includes a vehicle having at least one seat. A seat belt system provided with the at least one seat incudes a seat belt, a belt latch and a seat belt buckle. A haptic device is provided with the seat belt system, the haptic device generating a haptic signal.

In another aspect of the present disclosure, the haptic device is embedded in the seat belt buckle.

In another aspect of the present disclosure, the haptic device is embedded in the seat belt buckle during a manufacturing step that separately inserts the haptic device into a cavity of the seat belt buckle prepared to receive the haptic device.

In another aspect of the present disclosure, the haptic device is outwardly fixedly attached to the seat belt buckle.

In another aspect of the present disclosure, the haptic signal defines a vibration felt by a user seated in the vehicle seat when the belt latch is brought into a predetermined distance of the seat belt buckle.

In another aspect of the present disclosure, the haptic signal defines a sound heard by a user seated in the vehicle seat when the belt latch is brought into a predetermined distance of the seat belt buckle.

In another aspect of the present disclosure, the haptic device defines an array having multiple ultrasonic speakers, the ultrasonic speakers emitting and receiving reflected ultrasonic waves as an object is moved within a predetermined distance of the array.

In another aspect of the present disclosure, the object defines a hand of a user seated in the at least one seat.

In another aspect of the present disclosure, the haptic device or a similar haptic device is embedded in, fixed onto, or positioned within a predetermined distance to a seat control switch.

In another aspect of the present disclosure, the seat belt buckle includes at least one of: a light which may define a steady-on light or a blinking light to help a user seated in the at least one seat visually locate the seat belt buckle; and a buckle sensor detecting when the user releasably connects the belt latch from the seat belt buckle.

According to several aspects, a vehicle user notification system includes a seat system supporting a user. A haptic device provided with the seat system generates a haptic signal to notify the user of a location of an object of the seat system. A computer in communication with a vehicle control device and a vehicle control device together with the computer receiving data including a user seat occupancy and a vehicle operating status to assist the computer and the vehicle control device to generate control signals to initiate the haptic device.

In another aspect of the present disclosure, the seat system includes at least one seat positioned in a vehicle, and wherein the at least one seat includes a seat belt system to releasably restrain the user when the user is seated on the at least one seat.

In another aspect of the present disclosure, the seat belt system includes a seat belt, a belt latch and a seat belt buckle.

In another aspect of the present disclosure, the haptic device is incorporated on or in the seat belt buckle.

In another aspect of the present disclosure, the seat belt system includes a seat control switch.

In another aspect of the present disclosure, the haptic device is incorporated on or in the seat control switch.

In another aspect of the present disclosure, a user occupancy sensor is embedded within the seat system identifying when the user is present on the seat system. A seat belt payout sensor is incorporated within a seat belt assembly detecting a seat belt webbing movement when the user releasably connects a seat belt latch to a seat belt buckle. A proximity sensor including one of a camera, a radar device, and a light source is directed at the seat belt buckle identifying a position of the seat belt buckle.

According to several aspects, a vehicle haptic system includes a vehicle seat. A seat belt system is provided with the vehicle seat having a seat belt, a belt latch and a seat belt buckle. The belt latch is releasably coupled to the seat belt buckle. A first sensor identifies when a user is seated on the vehicle seat. A second sensor identifies when the belt latch approaches within a predetermined distance of the seat belt buckle. A haptic device provided with the seat belt system generates a haptic signal when the second sensor signals the belt latch is within the predetermined distance.

In another aspect of the present disclosure, a body having or in communication with an electrical circuit which communicates an electrical control signal to a mechanical device including a motor or a rotating device having an off-balanced member to generate a vibrational energy; wherein the vibrational energy increases with an increasing signal strength generated by the mechanical device, induced by an object approaching within a predetermined threshold distance of the haptic device.

In another aspect of the present disclosure, a current buckle to drive feature providing haptic feedback when a Buckle-to-Shift message is displayed to the user, the Buckle-to-Shift message is displayed when the driver attempts to shift the vehicle out of a park mode.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
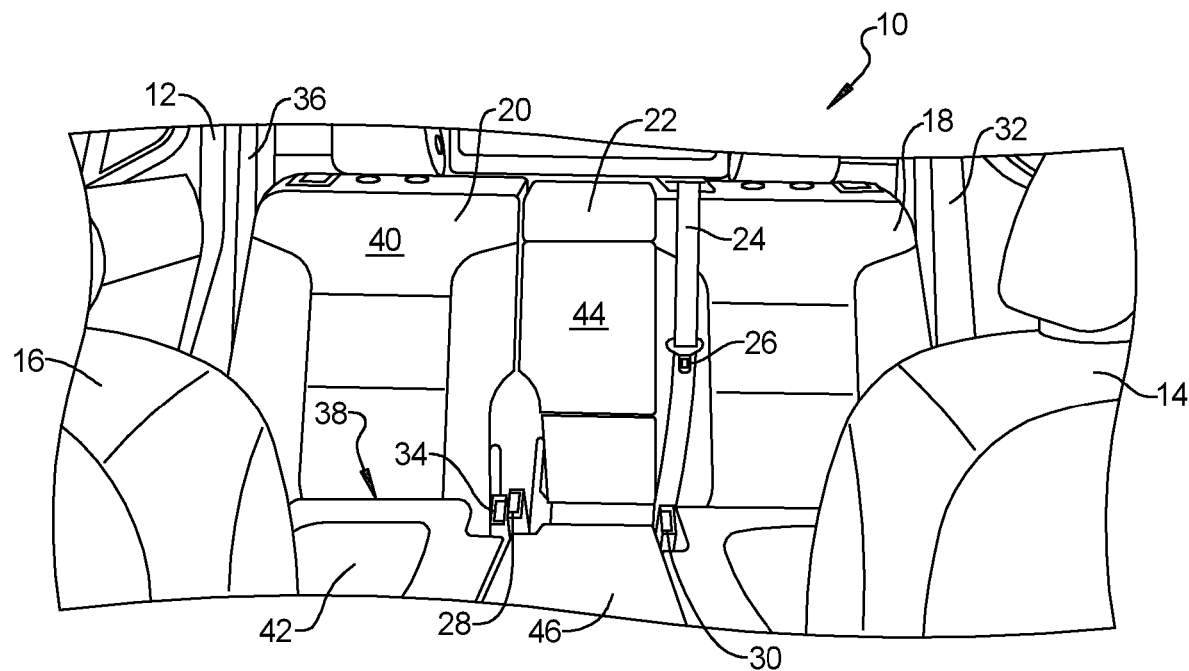
FIG. 1 is a front elevational view looking rearward of a system to locate seat controls and belt buckles according to an exemplary aspect.

Referring to FIG. 1, a haptic system to locate seat components 10 also defining a vehicle user notification system is provided in a vehicle 12 such as an automobile vehicle, a sport utility vehicle, a truck, a van, an electric vehicle, and an autonomously driven vehicle. The haptic system to locate seat components 10 includes multiple seats positioned within the vehicle 12 which may include a driver seat 14, a front passenger seat 16, a first rear passenger seat 18, a second rear passenger seat 20 and a rear middle passenger seat 22. Other seat configurations may be used including facing seats, seat benches, and captain's chairs. Vehicle users such as drivers and passengers seated in the vehicle 12 are individually provided with a seat belt system which includes for example a first rear seat belt 24 made for example of a woven belt or a polymeric belt, a first rear belt latch 26 and an object defining for example a first rear seat belt buckle 28 which receives and releasably latches the first rear belt latch 26 provided for a passenger seated in the rear middle passenger seat 22. It is noted that item numbers identified with an apostrophe herein represent the same or similar items described in a previous discussion of the drawings, such that additional description of the item is not provided.

Additional seat belts and belt latches are provided for users such as passengers seated for example on the first rear passenger seat 18 and the second rear passenger seat 20. These include a second object such as a second rear seat belt buckle 30 provided in tandem with a second rear seat belt 32, and a third rear seat belt buckle 34 provided in tandem with third rear seat belt 36. Belt latches for the second rear seat belt 32 and the third rear seat belt 36 are not clearly visible in this view. Certain belt buckles such as the first rear seat belt buckle 28 and the third rear seat belt buckle 34 may be grouped together and may therefore be more difficult to distinguish by a user.

According to several aspects the first rear seat belt buckle 28 and the third rear seat belt buckle 34 may also be positioned proximate to a junction 38 between a second rear passenger seat back 40 of the second rear passenger seat 20 and a second rear passenger seat cushion 42 of the second rear passenger seat 20, and further between a rear middle passenger seat back 44 and a rear middle passenger seat cushion 46. A proximity of the first rear seat belt buckle 28 and the third rear seat belt buckle 34 to the junction 38 and a possibility of one or both of the first rear seat belt buckle 28 and the third rear seat belt buckle 34 being pushed down below the junction 38 by multiple passenger uses may make locating any one of the first rear seat belt buckle 28 or the third rear seat belt buckle 34 difficult during latching of the first rear belt latch 26. To make it easier to locate a desired one of the first rear seat belt buckle 28 and the third rear seat belt buckle 34, or any one of the vehicle seat belt buckles, the haptic system to locate seat components 10 may provide haptic feedback to the user and may also provide lighting of individual ones of the seat belt buckles as discussed in greater detail in reference to the following figures.

Figure 2:
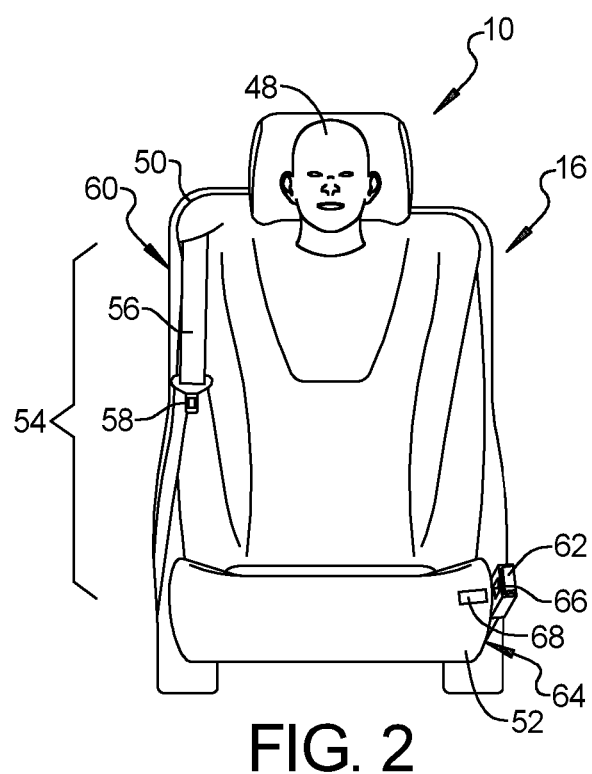
FIG. 2 is a front elevational view looking rearward of a passenger's seat of FIG. 1.

Referring to FIG. 2 and again to FIG. 1, the haptic system to locate seat components 10 may provide haptic feedback for a user 48 seated for example in the passenger seat 16. It is noted any of the vehicle seats may be occupied, therefore the passenger seat 16 is provided as an example only, and the discussion that follows applies equally to any of the vehicle seats. Further discussion of a user right-hand side and a user left-hand side correspond to the user 48 when seated in the passenger seat 16 and facing forward toward the viewer as shown in FIG. 2.

An upper body portion of the user 48 is supported by a seat back 50, and a lower body portion of the user 48 is supported by a seat cushion 52. A seatbelt assembly 54 to limit motion of the user 48 includes a belt 56 and a belt latch 58 which is slidably disposed on the belt 56, which are positioned proximate to a user right-hand side 60 of the passenger seat 16. A seat belt buckle 62 is positioned proximate to a user left-hand side 64 of the passenger seat 16 and substantially positionally fixed with respect to the user left-hand side 64 of the seat cushion 52. According to several aspects a haptic device 66 may fixed to or embedded within any of the previously noted objects including the seat belt buckle 62. The seat belt buckle 62 may also be positioned proximate to an object such as a seat control switch 68 also positioned on the user left-hand side 64 of the seat cushion 52.

Figure 6:
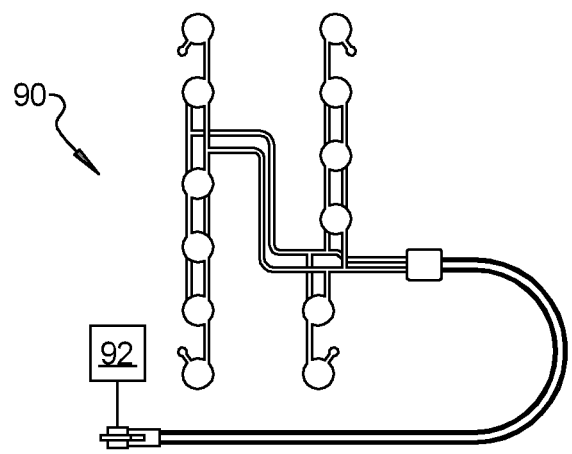
FIG. 6 is a top perspective view of a seat occupancy sensor used in conjunction with the system of FIG. 1.

To protect the user 48, the belt latch 58 is engaged with and releasably couples with the seat belt buckle 62. As the user 48 grasps the belt latch 58 normally positioned on the user right-hand side 60 of the passenger seat 16 and moves the belt latch 58 toward the seat belt buckle 62, the haptic device 66 emits a haptic signal shown and described in reference to FIG. 3 defining a vibration, a sound such as a tone or both. The term haptic as used herein is defined as the use of technology that stimulates the senses of touch and motion and reproduces sensations in a remote operation that are felt by a user such as the user 48 interacting directly with an object, including for example a seat belt buckle. According to several aspects, the haptic signal may be generated for example at the same time a vehicle ignition is initiated or when one or more occupant seat sensors described in greater detail in reference to FIG. 6 identify the user 48 is seated in a vehicle seat such as the passenger seat 16.

It is also noted the haptic system to locate seat components 10 may further include haptic feedback to assist the user 48 in locating other objects, which according to further aspects include the seat control switch 68 or any similar object selected by the manufacturer of the vehicle 12. For example, the haptic device 66 or a similar haptic device may be embedded in, fixed onto, or positioned within a predetermined distance to the seat control switch 68. To distinguish a haptic signal generated by the seat control switch 68 from the haptic signal generated by the haptic device 66, the haptic signal generated for location of the seat control switch 68 may operate at a different frequency, may produce a pulsing vibration or sound, or the like from the haptic signal generated by the haptic device 66.

Referring to FIG. 3 and again to FIGS. 1 and 2, the user 48 is presented manually holding the belt latch 58 for example in a right hand 70 of the user 48. As the belt latch 58 is moved in a predetermined distance to the seat belt buckle 62, the haptic device 66 emits a haptic signal 72. According to several aspects, the haptic device 66 may be embedded within the seat belt buckle 62, such as during a manufacturing step such as a molding step, or during a manufacturing step that separately inserts the haptic device 66 for example into a cavity of the seat belt buckle 62 prepared to receive the haptic device 66. According to other aspects, the haptic device 66 may be attached such as by fixing to an outer surface of the seat belt buckle 62. The haptic signal 72 may be both felt by the user 48 and heard by the user 48. The haptic signal 72 helps the user 48 to locate the seat belt buckle 62 during both daytime and nighttime operating hours.

Figure 3:
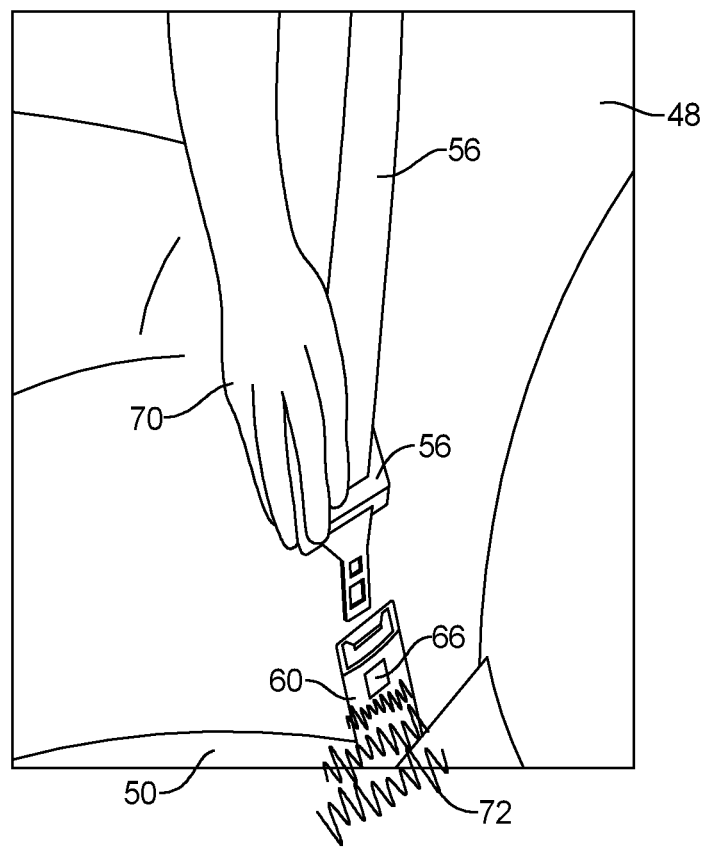
FIG. 3 is a side elevational view of the passenger's seat of FIG. 2.
Figure 4:
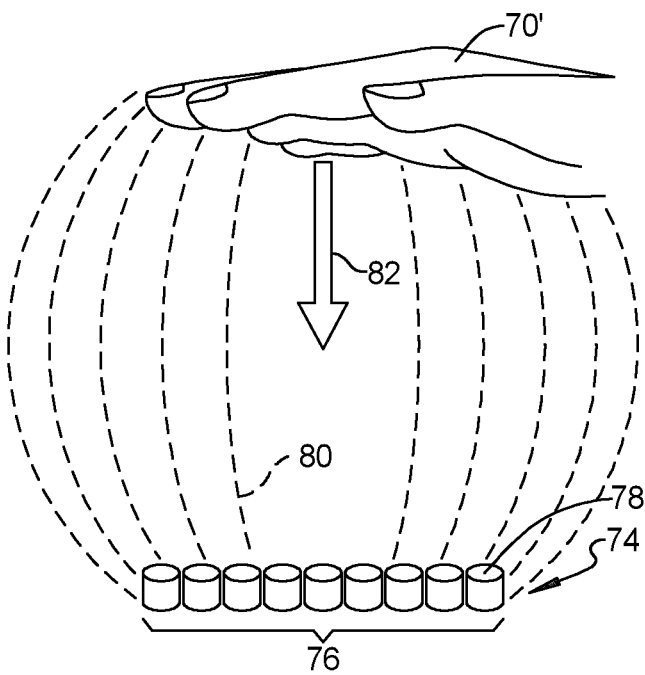
FIG. 4 is a front perspective view of an array of ultrasonic speakers acting as a haptic device of the present disclosure.

Referring to FIG. 4 and again to FIG. 3, according to additional aspects, in lieu of the haptic device 66 producing a signal when the seat belt latch 58 is brought into a close proximity such as a predetermined distance to the haptic device 66, a haptic device 74 may be used. Close proximity is defined herein as a predetermined distance required for the haptic device to sense the seat belt latch 58, which for example may be approximately 12 inches (30.5 cm) or less. The predetermined distance may also be less than or greater than 12 inches (30.5 cm) at the discretion of a vehicle designer. The haptic device 74 defines an array 76 having multiple ultrasonic speakers 78. The ultrasonic speakers 78 emit and receive reflected ultrasonic waves 80 as an object, which in the present example defines the hand 70' of the user 48, is moved within the predetermined distance of the array 76. The reflected ultrasonic waves 80 may be used to initiate actuation of an auditory alarm or signal which the user 48 may used to identify a location of an object such as a seat belt buckle. Similar to the haptic device 66, the haptic device 74 may be embedded in or fixed to a seat belt buckle or other object which the user 48 wishes to locate.

Figure 5:
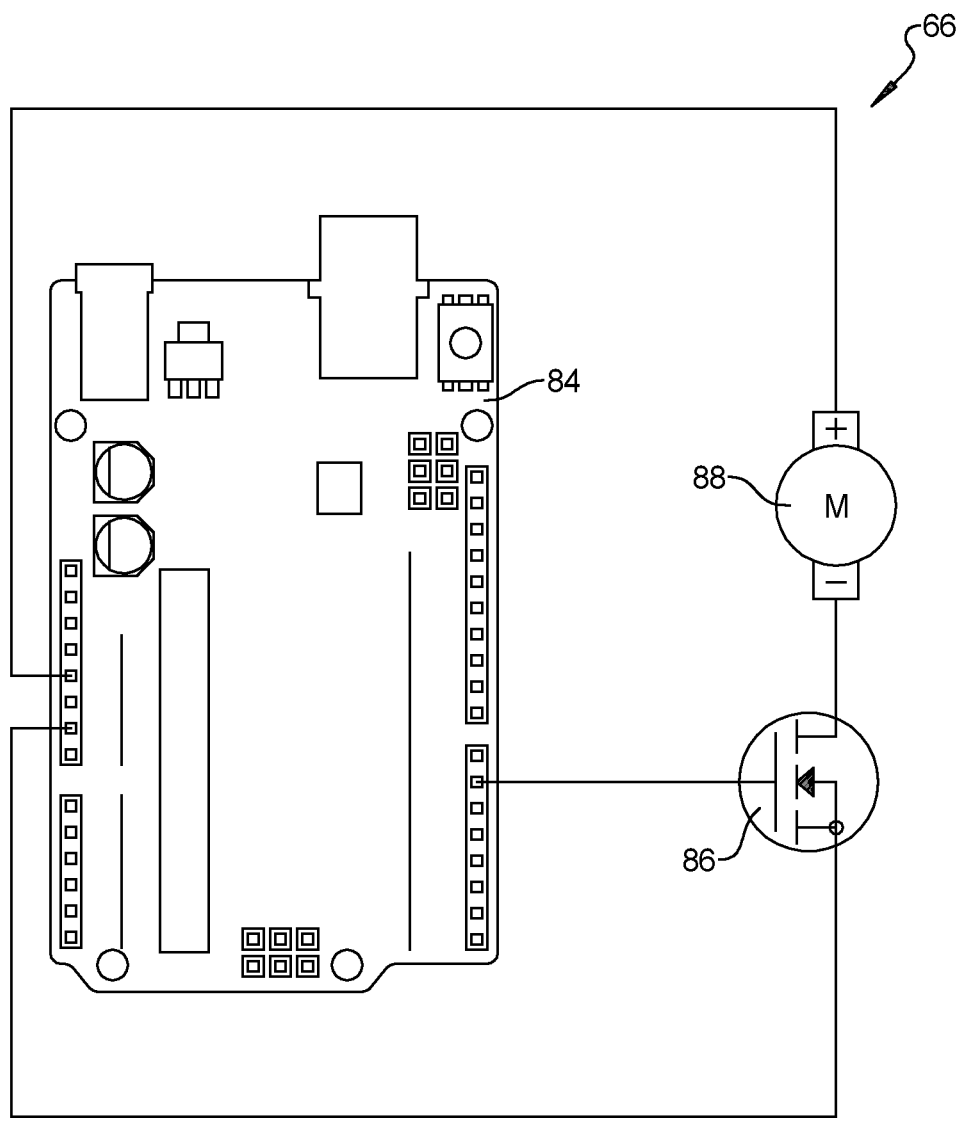
FIG. 5 is a front elevational view of an exemplary haptic device of the system of FIG. 1.

Referring to FIG. 5 and again to FIGS. 1 through 3, an exemplary embodiment of the haptic device 66 may include a body 84 having or in communication with an electrical circuit 86 which communicates an electrical control signal to a mechanical device 88. An example of the mechanical device 88 may include a motor or a rotating device having an off-balanced member to generate a vibrational energy. The vibrational energy may increase with an increasing signal strength generated by the mechanical device 88, which may be induced by an object approaching within a predetermined threshold distance of the haptic device 66, and may increase as the object further approaches within the predetermined threshold distance.

Referring to FIG. 6 and again to FIGS. 1 and 2, the haptic system to locate seat components 10 may provide different methods to control a frequency and intensity of a haptic signal. For example, an occupancy sensor 90 may be embedded within any of the vehicle seats such as the driver's seat 14. The occupancy sensor 90 is used to identify if the vehicle seat is occupied, otherwise a corresponding haptic device will not be activated for that vehicle seat.

Figure 7:
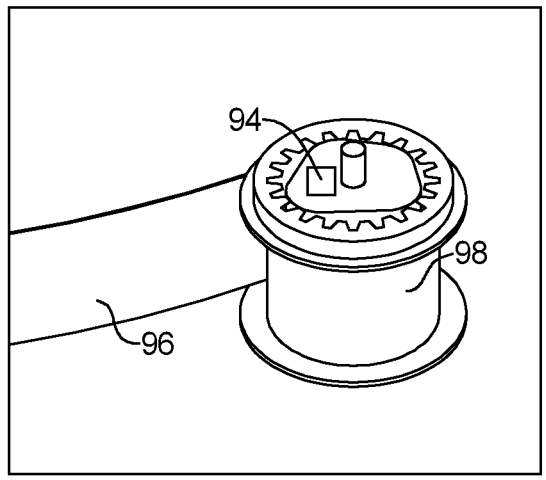
FIG. 7 is a front perspective view of a seat belt payout sensor used in conjunction with the system of FIG. 1.

Referring to FIG. 7 and again to FIGS. 1 and 2, the haptic system to locate seat components 10 may provide a seat belt payout sensor 94. The seat belt payout sensor 94 is incorporated within a seat belt assembly such as the seatbelt assembly 54 and detects seat belt webbing movement when the user 48 is in the process of buckling the seat belt latch to the seat belt buckle. According to several aspects, the seat belt payout sensor 94 may also be used as a condition for haptics activation.

Figure 8:
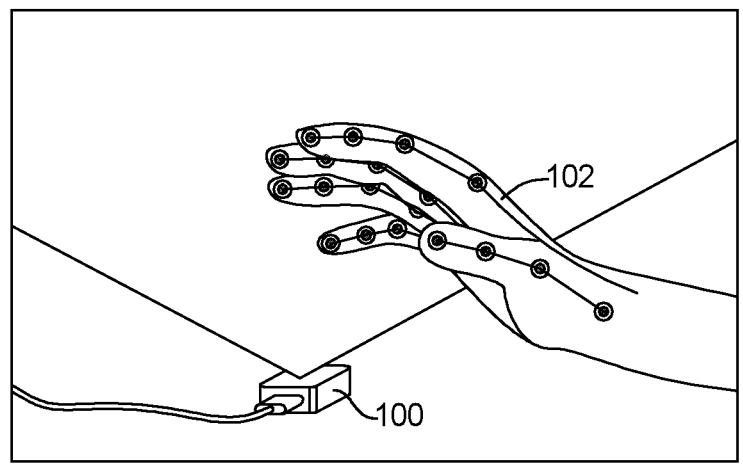
FIG. 8 is a front perspective view of a camera based proximity sensor used in conjunction with the system of FIG. 1.

Referring to FIG. 8 and again to FIGS. 1 and 2, the haptic system to locate seat components 10 may provide other proximity sensors 100 including a camera, a radar device, and a light source directed at a seat belt buckle. As the user's hand 70' approaches within a predetermined distance between the proximity sensor 100 and the seat-belt buckle, a frequency or an intensity of haptic vibration may be increased.

Referring to FIG. 9 and again to FIGS. 1 and 2, the seat belt buckle 104 and any seat belt buckle of the present disclosure may include a light 106 which may define a steady-on light or a blinking light to help visually locate the seat belt buckle 104. The illuminated light 106 may define a light emitting diode (LED) light positioned within the seat belt buckle used to aid the user in finding the seat belt buckle. The seat belt buckle 104 and any seat belt buckle of the present disclosure may also include a buckle sensor 108. The buckle sensor 108 detects when a user releasably connects such as by buckling the belt latch 58 to the seat belt buckle 104 or releasably disconnects such as by unbuckling the belt latch 58 from the seat belt buckle 104. Additional interior cabin lighting may be directed toward the seat belt buckle 104 and used to aid the user in finding a seat belt buckle 104.

Figure 9:
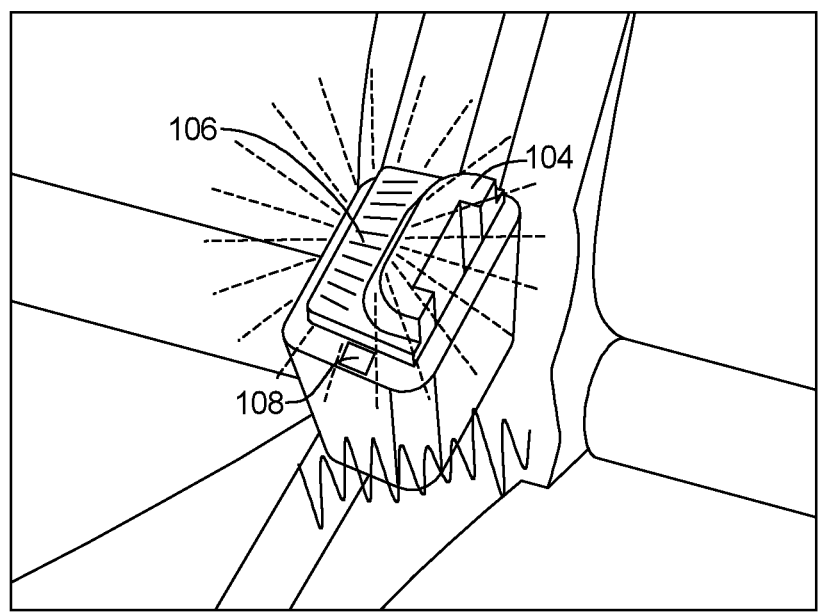
FIG. 9 is a front perspective view of a lighted seat belt buckle of the present disclosure.
Figure 10:
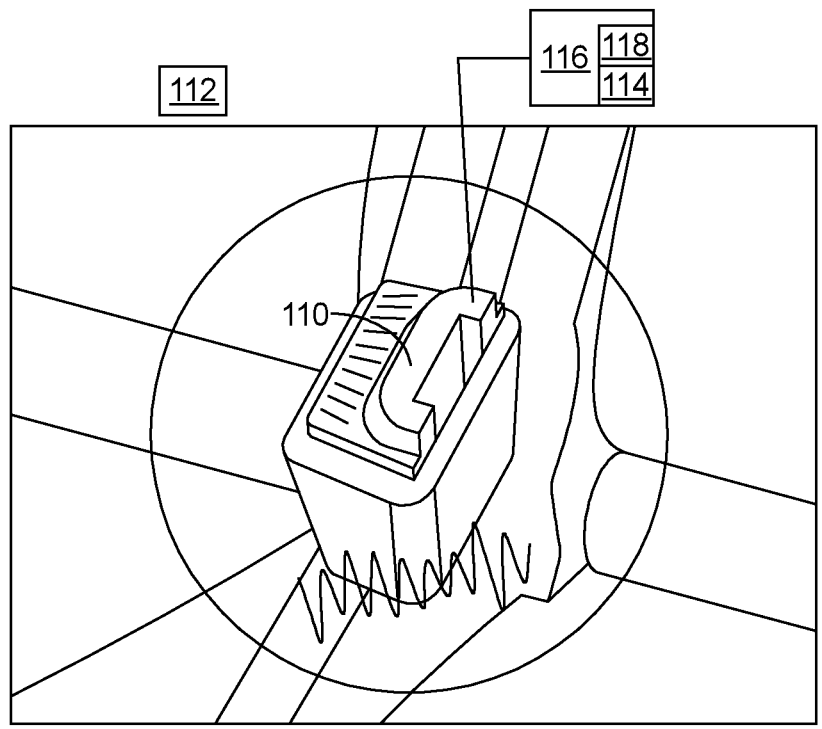
FIG. 10 is a front perspective view of a remotely lit seat belt buckle of the present disclosure.

Referring to FIG. 10 and again to FIGS. 1, 2 and 9, according to further aspects, the haptic system to locate seat components 10 may provide an enhanced current buckle to drive feature 110. The enhanced current buckle to drive feature 110 may provide haptic feedback when a "Buckle-to-Shift" message 112 is displayed to the user. The enhanced current buckle to drive feature 110 may be expand beyond a front row of vehicle seats and provide haptic feedback messaging for all users and occupants if user sensing is present for example in rear vehicle seats. The Buckle-to-Shift message 112 is displayed when a driver seated in the driver's seat 14 attempts to shift the vehicle 12 out of a park mode. The Buckle-to-Shift message 112 may also repeat a haptic feedback signal together with generation of an audible chime.

The haptic system to locate seat components 10 utilizes a computer 114 which may be positioned on-board the vehicle 12 which is programmed to operate and perform a method of operating the haptic system to locate seat components 10. The computer 114 may communicate with a vehicle control device 116 which receives data such as user seat occupancy and vehicle operating status to assist the computer 114 and the vehicle control device 116 to generate signals to initiate any of the haptic devices identified herein. The computer 114 is programmed to perform operations related to the system and method to operate the haptic system to locate seat components 10. The computer 114 is a non-generalized, electronic control device having a preprogrammed digital controller or processor, a memory 118 or a similar non-transitory computer readable medium used to store data such as control logic, software applications, instructions, computer code, data, lookup tables, etc., and a transceiver or input/output ports. The computer readable medium includes any type of medium capable of being accessed by a computer, such as read only memory (ROM), random access memory (RAM), a hard disk drive, a compact disc (CD), a digital video disc (DVD), or any other type of memory. The non-transitory computer readable medium excludes wired, wireless, optical, or other communication links that transport transitory electrical or other signals. The non-transitory computer readable medium includes media where data can be permanently stored and media where data can be stored and later overwritten, such as a rewritable optical disc or an erasable memory device. Computer code includes any type of program code, including source code, object code, and executable code. According to other aspects, the computer 114 may also be positioned off-vehicle, including in a remote computing station or in the cloud.

Haptic actuators of the present disclosure may be embedded in or nearby a seat or may create haptics in the air surrounding the vehicle seats using an array of ultrasonic speakers. Haptic actuators of the present disclosure may be provided in a vehicle seat, near a seat belt buckle, on a seat belt buckle which may generate some vibratory noise, or at a lower end of a seat belt buckle.

The haptic system to locate seat components 10 provides haptic seat belt feedback to vehicle users to help them locate seat belt buckles and to encourage seat belt usage. Haptic seat belt feedback may be initiated during a vehicle pre-ride time by one of the following inputs: 1) An operator intent to start the vehicle; 2) A vehicle occupancy is detected, which uses an occupancy sensor described for example in reference to FIG. 6; and 3) An occupant intent to buckle such as a change in a seat belt webbing tension which may be sensed using a sensor such as the seat belt payout sensor described in reference to FIG. 7.

Haptic seat belt feedback may be initiated at a vehicle post-ride time by one of the following inputs: 1) A vehicle power mode is transitioned to OFF; 2) A sound detected by one or more in-vehicle sound-based sensors such as the proximity sensors 100 defining a radar sensor or an ultrasonic sensor that detects by a received sound a user's intent to find a seat belt buckle.

A haptic system to locate seat components 10 of the present disclosure offers several advantages. These include a method to provide feedback to help users including drivers and passengers locate seat-belt buckles, a method to individually remind users including both drivers and passengers to buckle up their seat belt, and a system and method to control a timing, a frequency, and an intensity of vibrations based on situation and sensory inputs.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A haptic system to locate seat components, comprising:
a vehicle having at least one seat;
a seat belt system provided with the at least one seat having a seat belt, a belt latch and a seat belt buckle; and
a haptic device provided with the seat belt system, the haptic device generating a haptic signal, wherein the haptic device includes a body having or in communication with an electrical circuit which communicates an electrical control signal to a mechanical device including a motor or a rotating device having an off-balanced member to generate a vibrational energy, and wherein the vibrational energy increases with an increasing signal strength generated by the mechanical device, induced by an object approaching within a predetermined threshold distance of the haptic device.

2. The haptic system to locate seat components of claim 1, wherein the haptic device is embedded in the seat belt buckle.

3. The haptic system to locate seat components of claim 1, wherein the haptic device is embedded in the seat belt buckle during a manufacturing step that separately inserts the haptic device into a cavity of the seat belt buckle prepared to receive the haptic device.

4. The haptic system to locate seat components of claim 1, wherein the haptic device is outwardly fixedly attached to the seat belt buckle.

5. The haptic system to locate seat components of claim 1, wherein the haptic signal defines a vibration felt by a user seated in the seat when the belt latch is brought into a predetermined distance to the seat belt buckle.

6. The haptic system to locate seat components of claim 1, defines further comprising an array having multiple ultrasonic speakers, the ultrasonic speakers emitting and receiving reflected ultrasonic waves as the object or another object is moved within a predetermined distance of the array.

7. The haptic system to locate seat components of claim 6, wherein, the other object defines a hand of a user seated in the at least one seat.

8. The haptic system to locate seat components of claim 1, wherein the haptic device or a similar haptic device is embedded in, fixed onto, or positioned within in a predetermined distance to a seat control switch.

9. The haptic system to locate seat components of claim 1, wherein the seat belt buckle includes at least one of:
a light which is configured to define a steady-on light or a blinking light to help a user seated in the at least one seat visually locate the seat belt buckle; and
a buckle sensor detecting when the user releasably buckles the belt latch to the seat belt buckle.

10. A vehicle user notification system, comprising:
a seat system supporting a user;
a haptic device provided with the seat system, the haptic device generating a haptic signal to notify the user of a location of an object of the seat system, wherein the haptic device includes a body having or in communication with an electrical circuit which communicates an electrical control signal to a mechanical device including a motor or a rotating device having an off-balanced member to generate a vibrational energy, and wherein the vibrational energy increases with an increasing signal strength generated by the mechanical device, induced by an object approaching within a predetermined threshold distance of the haptic device; and
a computer in communication with a vehicle control device, the computer communicating and the vehicle control device receiving data including a user seat occupancy and a vehicle operating status to assist the computer and the vehicle control device to generate control signals to initiate the haptic device.

11. The vehicle user notification system of claim 10, wherein the seat system includes at least one seat positioned in a vehicle, and wherein the at least one seat includes a seat belt system to releasably restrain the user when the user is seated on the at least one seat.

12. The vehicle user notification system of claim 11, wherein the seat belt system includes a seat belt, a belt latch and a seat belt buckle.

13. The vehicle user notification system of claim 12, wherein the haptic device is incorporated on or in the seat belt buckle.

14. The vehicle user notification system of claim 11, wherein the seat belt system includes a seat control switch.

15. The vehicle user notification system of claim 14, wherein the haptic device is incorporated on or in the seat control switch.

16. The vehicle user notification system of claim 10, including:
a user occupancy sensor embedded within the seat system identifying when the user is present on the seat system;
a seat belt payout sensor incorporated within a seat belt assembly detecting a seat belt webbing movement when the user releasably connects a seat belt latch to a seat belt buckle; and
a proximity sensor including one of a camera, a radar device, and a light source directed at the seat belt buckle identifying a position of the seat belt buckle.

17. A vehicle haptic system, comprising:
a vehicle seat positioned in a vehicle;
a seat belt system provided with the vehicle seat having a seat belt, a belt latch and a seat belt buckle, the belt latch releasably coupled to the seat belt buckle;
a first sensor identifying when a user is seated on the vehicle seat;
a second sensor identifying when the belt latch approaches within a predetermined distance of the seat belt buckle; and
a haptic device provided with the seat belt system, the haptic device generating a haptic signal when the second sensor identifies the belt latch is within the predetermined distance, wherein the haptic device includes a body having or in communication with an electrical circuit which communicates an electrical control signal to a mechanical device including a motor or a rotating device having an off-balanced member to generate a vibrational energy, and wherein the vibrational energy increases with an increasing signal strength generated by the mechanical device, induced by an object approaching within a predetermined threshold distance of the haptic device.

18. The vehicle haptic system of claim 17, further including a current buckle to drive feature providing a haptic feedback when a Buckle-to-Shift message is displayed to the user, the Buckle-to-Shift message displayed when the user attempts to shift the vehicle out of a park mode.

\* \* \* \* \*